United States Patent [19]

Graetz et al.

[11] 4,322,328

[45] Mar. 30, 1982

[54] MANUFACTURE OF AQUEOUS POLYMER DISPERSIONS AND COATING COMPOSITIONS DERIVED FROM THEM

[75] Inventors: Clive W. Graetz, Glen Waverly, Australia; Morice W. Thompson, Cox Green, England

[73] Assignees: Imperial Chemical Industries Limited, London, England; Dulux Australia Limited, Melbourne, Australia

[21] Appl. No.: 102,107

[22] Filed: Dec. 7, 1979

[30] Foreign Application Priority Data

Dec. 7, 1978 [GB] United Kingdom ............... 47585/78

[51] Int. Cl.³ ........................................... C08L 33/04
[52] U.S. Cl. .................................. 524/458; 524/762; 524/833; 524/824; 524/813; 524/806; 524/457
[58] Field of Search ................. 260/29.6 H, 29.6 RW, 260/29.6 TA; 526/313, 320

[56] References Cited

U.S. PATENT DOCUMENTS

| | | | |
|---|---|---|---|
| 3,652,497 | 3/1972 | Junas | 260/29.6 RW |
| 3,657,175 | 4/1972 | Zimmerman | 260/29.6 T |
| 3,779,970 | 12/1973 | Evani | 260/29.6 RW |
| 3,891,591 | 6/1975 | Chang | 260/29.6 RW |
| 3,894,980 | 7/1975 | DeTommaso | 260/29.6 TA |
| 3,960,935 | 6/1976 | Samour | 260/29.6 TA |
| 4,038,265 | 7/1977 | Evani | 260/29.6 RW |
| 4,105,649 | 8/1978 | Evani | 260/29.6 RW |
| 4,138,381 | 2/1979 | Chang | 260/29.6 TA |
| 4,151,341 | 4/1979 | Lalk | 260/29.6 TA |

*Primary Examiner*—Paul R. Michl
*Attorney, Agent, or Firm*—Cushman, Darby & Cushman

[57] ABSTRACT

Sterically stabilized aqueous polymer dispersions of at least 20% solids content are made by free radical-initiated polymerization of monomers in an aqueous medium at a temperature at least 10° C. higher than the glass transition temperature of the polymer to be formed, in the presence of a compound which is soluble in the aqueous medium and contains in the molecule a polymeric component of molecular weight at least 1000 which is solvatable by the aqueous medium and an unsaturated grouping which can copolymerize with the monomers, the conditions being such that there is at no time present a separate monomer phase. The dispersions are useful as a basis of improved coating compositions.

10 Claims, No Drawings

MANUFACTURE OF AQUEOUS POLYMER DISPERSIONS AND COATING COMPOSITIONS DERIVED FROM THEM

This invention relates to the production of dispersions of polymer particles in aqueous liquid media in which the particles are stabilised against gross flocculation. More particularly, it relates to producing dispersions in which the stabilisation of the particles is achieved substantially by means of a steric mechanism. The invention also relates to coating compositions derived from dispersions so made.

By "gross flocculation" is meant herein a state in which, even at low solids contents, the dispersions contain many multi-particle aggregates.

Polymer dispersions are well known in which the particles of polymer are stably dispersed in water or an aqueous medium (in which by definition the polymer is insoluble), the stability of the particles being achieved at least to a major extent by the presence on the surface of the particles of electrical charges whereby repulsive forces are generated which counteract the natural tendency of the particles to attract one another. Such dispersions are the products of the so-called emulsion polymerisation processes, a characteristic of which is that the monomer being polymerised, as well as the polymer which is formed, is insoluble in the aqueous medium. The initiation of the polymerisation, and the maintenance of a fine emulsion of the monomer in the aqueous medium, are effected by ionisable species which are dissolved in the aqueous phase.

Other polymer dispersions are well known in which the particles of polymer are stably dispersed in a non-aqueous organic liquid medium (in which again the polymer is insoluble), and in which the particles are stabilised exclusively by means of their having attached to their surfaces polymeric chains of a nature such as to be inherently soluble in the non-aqueous medium; in this way there is formed around each particle a steric barrier of solvated and extended polymer chains which supplies the repulsive force necessary to prevent adjacent particles coming into contact with each other. The charge-stabilisation mechanism previously referred to is in general not applicable to non-aqueous liquid systems. This second type of polymer dispersion is most frequently obtained by means of a so-called non-aqueous dispersion polymerisation process, which has the characteristic that, whilst the polymer ultimately formed is insoluble in the non-aqueous liquid, the monomer being polymerised is actually soluble therein. The polymerisation is carried out in the presence of a steric stabiliser which is an amphipathic molecule incorporating one component which is inherently soluble in the liquid medium and another component which has an affinity for the surface of the polymer particles as they form and which in consequence becomes anchored thereto. A full treatment of the subject of non-aqueous dispersions is to be found in "Dispersion Polymerisation in Organic Media", ed. K. E. J. Barrett (John Wiley, 1975), and there are many published patent specifications relating to it, for example British Specifications Nos. 941,305; 1,052,241; 1,122,397; 1,123,611; 1,143,404; 1,231,614.

Whilst for many purposes the production of stable polymer dispersions in non-aqueous organic liquid media is of considerable technical and commercial importance, there are nevertheless advantages in being able to obtain comparable dispersions in water or aqueous media. This is particularly true where the dispersions are intended for use in coating compositions, since the use of water as a carrying liquid avoids the problems of pollution associated with the evaporation of volatile organic liquids. The known aqueous polymer dispersions of the kind referred to above have indeed found extensive use in the formulation of coating compositions, but they nevertheless fall short of being wholly satisfactory for that purpose. Although, in these dispersions, some measure of steric stabilisation of the disperse phase particles may operate, as the result of the use of non-ionic surfactants or protective colloids, the fact that stabilisation is chiefly brought about by the use of low molecular weight, water-insoluble surfactants can lead to problems of various kinds, notably water-sensitivity of the derived film. Attempts have previously been made to prepare aqueous dispersions in which the polymer particles are wholly stabilised by a steric mechanism analogous to that which operates in non-aqueous dispersions. These attempts, however, have not been successful; in particular, it has not proved possible to achieve adequate stability of the particles against flocculation except where the polymer content of the dispersion was so low as to render it of little value for the formulation of coating compositions.

We have now, however, found a process whereby sterically stabilised dispersions of polymers in aqueous media, having high polymer contents and hence being suitable for use in coating compositions, may be satisfactorily prepared.

According to the present invention there is provided a process for the production of a sterically stabilised dispersion of polymer particles of a size in the range 0.01 to 10 microns in an aqueous medium, the process comprising the free radical-initiated polymerisation in the aqueous medium of one or more ethylenically unsaturated monomers at a temperature which is at least 10° C. higher than the glass transition temperature as hereinafter defined of the polymer which is formed, in the presence of a stabiliser precursor compound which is soluble in the aqueous medium and which contains in the molecule a polymeric component of molecular weight 1000 which is solvatable by the aqueous medium and an unsaturated grouping which is capable of copolymerising with the said monomer or monomers, the aqueous medium being a mixture comprising (a) at least 30% by weight of water and (b) not more than 70% by weight of a second constituent which is miscible with water, the nature and proportion of the second constituent being such that the mixture as a whole is capable of dissolving the monomer or monomers being polymerised to the extent of at least 3% by weight but is a non-solvent for the polymer formed, the concentration of free monomer in the polymerisation mixture being maintained throughout the process at a level such that at no time does the free monomer form a separate phase and the total amount of monomer polymerised being such that the resulting dispersion contains at least 20% by weight of polymer.

The second constituent of the aqueous medium may be a single substance or it may be a water-miscible mixture of two or more substances. Preferably the aqueous medium is capable of dissolving the monomer or monomers to the extent of at least 10% by weight.

By "glass transition temperature" (Tg) we mean the temperature at which the polymer which is produced in the process of the invention passes from the glassy state to the rubbery state, or vice versa. The Tg value in question will normally be that of the bulk polymer as 100% material, but in a case where, as subsequently described, a plasticising substance is deliberately added to the polymerisation mixture for the purpose of reducing the effective Tg of the polymer, the Tg value for the purposes of the invention is that of the plasticised polymer. Even where a plasticiser for the polymer is not added as such, the "environmental" Tg of the polymer under the conditions obtained during polymerisation may be somewhat lower then the bulk Tg value referred to above, owing to some plasticisation of the polymer by residual monomer or other constituents of the polymerisation mixture. Thus it may be possible in practive to operate with a somewhat lower minimum polymerisation temperature than that indicated by the bulk Tg value. However, the effect of such fortuitous plasticisation on the Tg value is difficult to predict and, whilst it can in principle be determined by simple trial and error, it is more convenient under these conditions to choose the temperature of polymerisation by reference to the bulk Tg value. The Tg of a bulk polymer, or of a deliverately plasticised polymer may be determined for the present purposes, by experimental methods which are well known to those skilled in the art, upon polymer of the same composition as that which is to be formed in the process of the invention but obtained by some other route, for example by polymerisation of the monomers in bulk or in solution, with subsequent addition of plasticiser where appropriate. Alternatively, Tg values can be calculated, from a knowledge of the monomer composition of the polymer, by known methods.

By way of illustration, the following bulk Tg values may be quoted (ratios stated are by weight): for a 50:50 methyl methacrylate/butyl acrylate copolymer, 4° C.; for a 80:20 methyl methacrylate/2-ethylhexyl acrylate copolymer, 41° C.; for a homopolymer of ethyl acrylate, −22° C.; for a homopolymer of methyl methacrylate plasticised in the ratio 60:40 with a neopentyl glycol/butyl alcohol adipate polyester plasticiser, 55° C. Any of these polymer compositions can be successfully prepared in the form of an aqueous latex by the process of the invention at the polymerisation temperatures in the range 70°-90° C. which are normally employed for the polymerisation of acrylic monomers in the presence of an azo initiator.

Ethylenically unsaturated monomers which may be used in the process of the invention include in particular the acrylic monomers, that is to say acrylic acid or methacrylic acid and their alkyl esters such as methyl methacrylate, ethyl methacrylate, butyl methacrylate, lauryl methacrylate, ethyl acrylate, butyl acrylate, hexyl acrylate, n-octylacrylate, 2-ethylhexyl acrylate, nonyl acrylate, lauryl acrylate and cetostearyl acrylate, the hydroxyalkyl esters of the same acids such as 2-hydroxyethyl acrylate, 2-hydroxyethyl methacrylate and 2-hydroxypropyl methacrylate, and the nitriles and amides of the same acids such as acrylonitrile, methacrylonitrile, acrylamide and methacrylamide. Other monomers which may be used, either alone or in admixture with these acrylic monomers, include vinyl aromatic compounds such as styrene and vinyl toluene, vinyl esters of organic and inorganic acids such as vinyl acetate, vinyl propionate, vinyl chloride and vinylidene chloride. Yet other comonomers which may be used in conjunction with any of the foregoing monomers include dialkyl maleates, dialkyl itaconates, dialkyl methylene-malonates, isoprene and butadiene.

Where it is desired that the latex polymer should be of the cross-linkable or thermosetting type, the monomers from which it is derived will normally include a proportion of at least one monomer carrying a reactive group, such as one of the hydroxy monomers mentioned above or an N-(alkoxy-alkyl) derivative of acrylamide, e.g. N-(n-butoxymethyl) acrylamide, or a monomer carrying an epoxy group, such as glycidyl methacrylate.

Preferably, the temperature of polymerisation of the monomer or monomers is at least 20° C., more preferably at least 30° C., higher than the glass transition temperature of the polymer which is formed. In general, polymerisation temperatures in the range 30°-80° C. are convenient.

Thus, in principle, the temperature at which the polymerisation is carried out will be determined first and foremost with reference to the Tg value of the polymer which it is proposed to produce in dispersion, and, having decided upon that temperature, one will then proceed to choose an appropriate composition for the aqueous medium in which the process is to be conducted. In order to help the maintaining of a constant polymerisation temperature, it is preferred to arrange that the aqueous medium can boil under reflux at that temperature, and the nature and proportion of the water-miscible second constituent of the mixture will then be selected with this object in mind. Having regard to the fact that, for many of the monomers likely to be used in the process, an effective polymerisation temperature will lie in the range 70°-90° C., the second constituent of the aqueous medium, or a constituent thereof, will usually require to be a liquid of boiling point significantly lower than that of water.

In practice, there may be some interaction between these variables; for example, the freedom of choice of composition of the aqueous medium to suit a particular operating temperature may be restricted by the need to find a water-miscible second constituent which does not have a strong solvent action on the polymer which is formed, otherwise the aqueous medium as a whole may not be a non-solvent for the polymer and there may be significant production of polymer in solution rather than in dispersion. In the case where the aqueous medium contains a relatively volatile water-miscible liquid, the available range of formulations may be increased by including therein a further water-soluble constituent which does not boil below the boiling temperature of water; such a further constituent may be either a solid or a liquid, capable of assisting the achievement of the necessary solvent/non-solvent characteristics in the aqueous medium. It will be desirable, however, to retain a sufficient proportion of the lower-boiling constituent to permit refluxing of the polymerisation mixture. Another factor to be borne in mind is the desirability or otherwise of the continuous phase of the final dispersion permanently containing materials other than water only. Where the water-miscible liquid constituent of the aqueous medium is sufficiently volatile to permit refluxing at the polymerisation temperature, that constituent can usually, if desired, be stripped off by distillation when polymerisation is complete. In contrast, a water-miscible constituent of higher boiling point may not be removable from the continuous phase in this way.

The use of the term "aqueous medium" herein does not imply that water should always be the major constituent of the medium in which the polymerisation is carried out; in many cases, the water-miscible constituent or constituents may predominate in the mixture. In practice, as high a proportion of water as possible is employed, consistent with the aqueous medium being capable of dissolving the monomer being polymerised at least to the extent necessary to avoid the existence of a separate monomer phase, and at the same time being a non-solvent for the polymer produced. Evidently the degree of solvency for the monomer which the aqueous medium is required to possess will depend upon the concentration of free monomer in the polymerisation mixture which it is desired to maintain during the process, which in turn will depend upon the rate at which it is desired that the polymerisation should proceed. In practice, water will most usually constitute 30-70% by weight of the aqueous medium.

Substances which are suitable for use as the water-miscible constituent of the aqueous medium include in particular the lower aliphatic alcohols; the preferred member of this class is methanol, but ethanol is also very suitable. Water-methanol mixtures can be prepared having boiling points which lie both in the optimum polymerisation temperature range and sufficiently above the polymer glass transition temperatures for the process of the invention to be carried out satisfactorily in such mixtures with a variety of acrylic or vinyl monomers. Ethanol is somewhat less preferred than methanol because its greater effectiveness as a chain terminator in the polymerisation process may make it difficult to obtain a disperse polymer of high molecular weight, and also because it is a more active solvent for many polymers than is methanol. Nevertheless, ethanol is useful where the monomer mixture to be polymerised contains an appreciable proportion of styrene. In the case of polymers derived from acrylic or methacrylic esters of higher alcohols, e.g. lauryl methacrylate, a suitable water-miscible constituent is acetonitrile.

Suitable water-miscible substances having a boiling point above that of water include, for example, butanol, 2-methoxyethanol, 2-ethoxyethanol, ethylene glycol, diethylene glycol and tetraethylene glycol. In general, the proportion of such substances which it is possible to use in the aqueous medium will be relatively low because they tend to be effective solvents for many polymers.

Although simple experimentation may sometimes be called for, the formulation of a suitable aqueous medium which meets the various requirements set out above does not present any serious difficulty in the majority of cases, especially if the Tg of the polymer to be formed does not exceed 60° C.

Steric stabilisation of the polymer particles produced in the process is effected as the result of the presence in the polymerisation mixture of the compound comprising a solvatable polymeric component and a copolymerisable unsaturated grouping. It is believed that the copolymerisation of this compound with a minor proportion of the monomer or monomers being polymerised leads to the production of an amphipathic graft copolymer which is the actual stabilising species. Accordingly the compound in question is referred to herein as the "precursor" for the graft copolymer stabiliser. The graft copolymer stabiliser is a molecule containing two components of differing characteristics. The first component is a polymer chain of molecular weight at least 1000 derived from the precursor which is solvated by the aqueous medium by virtue of the fact that, when in the form of an independent molecule, it is actually soluble in that medium. The second component is another polymer chain which is similar in chemical composition to the disperse polymer being formed in the process and which is, like that polymer, not solvated by (i.e. per se insoluble in) the aqueous medium; this component becomes associated with, or anchored to, the particles of disperse polymer, whilst the chains of the solvated component assume an extended configuration in the environment of the aqueous medium and thereby build a steric barrier around each particle which overcomes the natural tendency of adjacent particles to flocculate.

The solvatable polymeric component will, as stated above, be derived from a water-soluble polymer, examples of which include non-ionic polymers such as the polyethylene glycols and their monoalkyl ethers, poly(ethylene oxide)—poly(propylene oxide) block copolymers and their monoalkyl ethers, and polyvinylpyrrolidone. Preferably the molecular weight of this component is at least 1500 and more preferably at least 2000. The preferred solvatable components are those derived from polyethylene glycols, or their monoalkyl ethers, of molecular weight in the range 2000-4000. The precursors which are introduced into the polymerisation mixture are derivatives of such water-soluble polymers containing a copolymerisable unsaturated grouping, which in the case of the polyethylene glycols, or their ethers, may conveniently be esters of these substances with copolymerisable unsaturated acids, for example methacrylic acid, itaconic acid or maleic acid. Esterification of the glycol, or ether thereof, may be effected by an ester-interchange reaction with a lower alkylester of the unsaturated acid, for example with methyl methacrylate; alternatively the glycol or its ether may be reacted with a suitable acid chloride, for example methacrylyl chloride, in the presence of a hydrogen chloride acceptor. Yet again, the glycol or its ether may be reacted directly with the unsaturated acid to give the ester, or with its anhydride to form a half-ester. Other suitable precursors may be obtained by reacting a carboxyl group-terminated polyvinylpyrrolidone (see, British Specification No. 1,096,912) with glycidyl methacrylate. Yet other suitable precursors may be obtained by the procedure described in our copending application Ser. No. 101,265 filed Dec. 7, 1979, that is to say by reacting a water-soluble polyalkylene glycol or its monoalkyl ether with a cyclic aliphatic carboxylic anhydride and then reacting the resulting half-ester with an epoxy compound containing a polymerisable double bond. For example, the monoethyl ether of a polyethylene glycol is reacted with succinic anhydride and the product then condensed with glycidyl methacrylate to give a precursor containing a terminal vinyl grouping. As explained in the co-pending application referred to, this method of making a precursor is convenient because it avoids the necessity of removing any by-products or excess reagents, which could interfere with the subsequent use of the precursor, that arises with most of the other methods discussed above.

The proportion of stabiliser precursor which is added to the polymerisation mixture will vary to some extent according to the particular disperse polymer which is involved and the disperse particle size which it is desired that the resulting dispersion should have, and the optimum proportion in any individual case can readily be found by simple experiment. However, for general guidance it may be stated that the proportion in question will usually lie in the range 0.5-20%, and more especially 2-10%, by weight of the disperse polymer content of the dispersion being made. Preferably, the precursor is introduced along with the monomers, as explained below.

The process of the invention will usually require the presence in the polymerisation mixture of a suitable catalyst or initiator capable of producing free radicals. Suitable substances for this purpose are those catalysts or initiators well known for use in the polymerisation of acrylic or vinyl monomers which are soluble in the monomers, in particular azo compounds such as azo diisobutyronitrile and 4,4-azobis(4-cyanovaleric acid), or peroxy compounds such as benzoyl peroxide, lauroyl peroxide and diisopropyl peroxydicarbonate. To some extent, the choice of initiator can influence the temperature at which the polymerisation is carried out and thus may constitute a further factor to be considered in deciding the overall composition of the polymerisation mixture as discussed above. However, azo compounds are generally to be preferred over peroxy compounds in view of the tendency of the latter to promote random grafting of the monomers on to the solvated component of the precursor. The amount of catalyst or initiator used will normally lie in the range 0.5% to 2% of the weight of monomer, and here also the addition is preferably made along with the monomers being polymerised.

There may also be present during the polymerisation process a chain transfer agent which, unlike the catalyst or initiator, is soluble in the aqueous medium. An example of a suitable agent is thioglycollic acid. The chain transfer agent may be used in an amount of from 0.1% to 2% of the weight of monomer. The effect of the chain transfer agent is to regulate the molecular weight of the disperse polymer and ultimately to reduce the proportion of finer particles in the disperse phase, thus increasing the average particle size.

In carrying out the process of the invention, it is preferred to introduce the monomer or monomers gradually into the aqueous medium, rather than to add the total monomer charge all at once. This procedure may in fact be essential in many cases if the condition is to be satisfied that at no time during the polymerisation should there be present a separate monomer phase. Where two or more monomers are involved, these may be pre-mixed before being fed into the aqueous medium. A particularly preferred procedure, whereby improved control of particle size of the disperse polymer is achieved, is to add initially to the aqueous medium a small portion, not exceeding 20% by weight, of the total monomer charge, together with an appropriate amount of initiator and the whole or the greater part of the stabiliser precursor required. This initial charge, which may be added all at once provided that the aqueous medium is capable of dissolving it completely, is allowed to polymerise first; the reaction mixture is initially clear and homogeneous, but subsequently becomes opalescent as a very fine "seed" dispersion of polymer is formed. Following this, the main portion of the monomer charge, containing initiator and the remainder, if any, of the precursor, is fed in steadily at a rate sufficient to maintain an acceptable speed of polymerisation but not such as to cause monomer to form a separate phase in the polymerising mixture. Where the polymerisation is carried out at the reflux temperature of the aqueous medium, it is preferred to arrange for this main monomer feed to mix with the returning distillate so that it is well diluted before it enters the reaction zone; this distillate will normally be rich in the second, water-miscible constituent of the aqueous medium and will be a good solvent for the monomer being introduced. The rate of monomer feed is preferably such that the monomer is diluted with at least its own volume of returning distillate. It may be desirable in some cases to reserve a portion of the monomer charge for final addition to the polymerising mixture without further precursor being present.

In the case where the process of the invention is performed, as described above, by gradual "feed" of monomer to a preformed "seed" dispersion of polymer, it is possible to form the "seed" particles from monomer different from the main monomer which is subsequently introduced in the "feed" stage. Such "seed" monomer does not need to satisfy the requirement hereinbefore stated that the polymerisation temperature should be at least 10° C. higher than the glass transition temperature of the polymer (viz. the "seed" polymer) which is formed. Thus, essentially any monomer may be used in the "seed" stage so long as it does not amount to more than 20% of the aggregate of its own weight and the weight of the main monomer, does not form a separate phase in the reaction mixture and gives rise to a polymer which is insoluble in the aqueous medium. For example, where the main disperse polymer is to be derived from a mixture of methyl methacrylate and 2-ethylhexyl acrylate (Tg of polymer, approximately $-10°$ C.; polymerisation temperature, 76°-80° C.), it is possible to employ methyl methacrylate alone (Tg of polymer, 105° C.) in a "seed" stage; the main monomers are then introduced in the "feed" stage to give rise to the main disperse polymer. It is, however, to be understood that, in a "seed-feed" procedure as just described, the "feed" stage must always be conducted in accordance with the definition of the process of the invention hereinabove given.

Other substances which may be added to the polymerisation mixture include, as already mentioned, a plasticiser for the disperse polymer, where it is desired that the latter should be softer than the unmodified polymer. The addition of plasticiser may, indeed, render it possible to apply the process of the invention to certain monomers where it would otherwise fail. For example, the homopolymer of methyl methacrylate has a Tg of 105° C. and it is practically impossible to operate the present process with methyl methacrylate as the sole monomer so as to produce a stable latex; however, by the addition of plasticiser the Tg can be brought down to a level where the process can successfully be carried out. Suitable plasticisers are any of those which are well known in the art for use with the particular polymer in question; they may either soluble or insoluble in the aqueous medium. Conveniently the plasticiser may be added to the polymerisation mixture along with the monomer or monomers.

By the process of the invention, aqueous polymer dispersions may readily be made which have disperse phase contents in the range 40–60% by weight, and even as high as 70% by weight, and which are effectively stabilised against flocculation or aggregation of the disperse polymer. The polymer particles may vary considerably in size, a normal range of variation being from 0.05 to 5 microns; within this broad range, the particles in any individual dispersion will usually show a distribution of sizes, in which the largest particles may be up to ten times the diameter of the smallest. Such dispersions are especially suitable as the basis of waterborne coating compositions, having a number of advantages for this purpose over conventional, charge-stabilised dispersions made by aqueous emulsion polymerisation procedure. Thus the dispersions made according to the invention are stable towards gross flocculation of the disperse phase over the whole range of pH, whereas known dispersions are stable only over limited pH ranges; they are also stable in the presence of polyvalent ions, which is not usually the case with ionically stabilised dispersions, and show improved freeze-thaw stability. All these features greatly facilitate the formulation of coating compositions from the dispersions. Furthermore, the coating compositions themselves show greatly improved flow and film integration properties as compared with compositions based on conventional dispersions.

The coating compositions incorporating dispersions made according to the invention may be of either the thermosetting type or the thermoplastic type, depending upon whether or not the disperse polymer contains any reactive groupings which can bring about cross-linking, either with or without the addition of a cross-linking agent such as a melamine-formaldehyde resin (which may be, but is not necessarily, water-soluble), in a heat treatment step subsequent to the application of the composition to a substrate. If desired, an external cross-linking agent can be introduced into the dispersion by adding it to the aqueous medium prior to polymerisation of the monomers from which the disperse polymer is formed, provided that the agent in question does not undergo any reaction under the conditions of polymerisation (which will normally be true of, for example, an amino resin at the temperature at which many acrylic or vinyl monomers are polymerised). Other desirable additives to a coating composition based on the dispersions, which may also be introduced at the polymerisation stage, are reactive silicon compounds capable of reacting with hydroxyl groups in the disperse polymer, whereby the polymer is enabled to produce a coating of enhanced durability; such a compound is, for example, the intermediate QP8-5314 marketed to Dow Corning Inc.

The actual procedure of making polymer dispersions according to the invention is more straightforward in certain respects than the conventional emulsion polymerisation techniques, in particular that the pH of the polymerisation mixture is not critical, nor is the speed at which it is stirred; also the possibility of carrying out the polymerisation under reflux makes the maintenance of a steady reaction temperature much simpler.

The invention is illustrated but not limited by the following Examples, in which parts and percentages are by weight.

EXAMPLE 1

Preparation of latex of a thermosetting-type polymer having a theoretical Tg of 10° C., in 39:61 water/methanol mixture at reflux temperature To a 2-liter flask fitted with stirrer, thermometer, inert gas inlet and reflux condenser with provision for feeding ingredients into the returning distillate there was charged:

| Charge A | |
|---|---|
| Distilled water | 315 g |
| Methanol | 500 g |

There was then added the following mixture:

| Charge B | |
|---|---|
| Methyl methacrylate | 26 g |
| Butyl acrylate | 24 g |
| Stabiliser precursor (as described below) | 17.5 g |
| Azodiisobutyronitrile | 1.0 g |

The contents of the flask were then heated at reflux temperature (73° C.) for 30 minutes to form a seed dispersion of polymer. There was then commenced the dropwise feed into the returning distillate of the following mixture:

| Charge C | |
|---|---|
| Methyl methacrylate | 210 g |
| Butyl acrylate | 165 g |
| N-Butoxymethyl acrylamide (60% solution in 3:1 butanol/xylene) | 44 g |
| Methacrylic acid | 11 g |
| Stabiliser precursor (as described below) | 14.5 g |
| Azidiisobutyronitrile | 6.7 g |

The addition of Charge C occupied 3 hours. When this was complete, there was added in the same manner, over a period of 45 minutes, the following mixture:

| Charge D | |
|---|---|
| Methyl methacrylate | 45 g |
| Butyl acrylate | 34 g |
| N-Butoxymethylacrylamide (60% solution in 3:1 butanol/xylene) | 11 g |
| Methacrylic acid | 2.7 g |
| Azodiisobutyronitrile | 1.3 g |

One half-hour after this final feed was complete, there was added Charge E consisting of a further 0.8 g of azidiisobutyronitrile (dissolved in about 10 g of the distillate returning from the reflux condenser). Heating was thereafter maintained at reflux temperature for a further 30 minutes, and alcohol was finally removed by distillation to give a stable latex of 54% solids content. The disperse polymer had the composition methyl methacrylate 51%, butyl acrylate 40.5%, N-butoxymethylacrylamide 6% and methacrylic acid 2.5%; it had a molecular weight of about 140,000 and a Tg of 10° C. The disperse phase particles ranged in size from 0.1 to 1.0 micron. The stabiliser precursor used in this preparation was the methacrylic acid ester of the monomethylether of polyethylene glycol, mol.wt. 2000, prepared by the action of methacrylyl chloride upon the hydroxy compound in the presence of a hydrogen chloride acceptor. The proportion of the precursor used was 5.5% of the non-volatile content of the latex.

EXAMPLE 2

Preparation of latex of thermosetting-type polymer having a theoretical Tg of 14° C., in 40:60 water/ethanol mixture under reflux To a flask fitted as described in Example 1 there was charged:

| Charge A | |
|---|---|
| Distilled water | 330 g |
| Ethanol | 480 g | followed by:

| Charge B | |
|---|---|
| Styrene | 15 g |
| Methyl methacrylate | 11 g |
| Butyl methacrylate | 14 g |
| 2-Ethylhexyl acrylate | 12 g |
| Stabiliser precursor (as described below) | 3.5 g |
| Azodiisobutyronitrile | 1 g |

The contents of the flask were heated at reflux temperature (76° C.) for 30 minutes to form a seed polymer dispersion. There was then added a further 15 g of the stabiliser precursor (Charge C). Immediately after this there was begun the dropwise feeding, over a period of 2 hours and into the returning distillate, of the following mixture:

| Charge D | |
|---|---|
| Styrene | 74 g |
| Methyl methacrylate | 53 g |
| Butyl methacrylate | 74 g |
| 2-Ethylhexyl acrylate | 63 g |
| 2-Hydroxypropyl methacrylate | 32 g |
| Stabiliser precursor (as described below) | 4.5 g |
| Azodiisobutyronitrile | 6 g |

This was followed by a dropwise feed over a similar period of time of an exactly similar mixture except for omission of the stabiliser precursor (Charge E). Finally, 30 minutes after completion of this last addition, a further 1g of azodiisobutyronitrile (Charge F) was introduced and the mixture maintained at reflux temperature for 1 hour more. The product was then strippd of alcohol by distillation to give a stable latex of solids content 54%.

The disperse polymer had the composition styrene 25%, methyl methacrylate 18%, butyl methacrylate 25%, 2-ethylhexyl acrylate 22% and 2-hydroxypropyl methacrylate 10%; and a theoretical Tg of 14° C. The particle size range of the disperse phase was 0.1–1.0 micron. The stabiliser precursor used in this preparation was the methacrylic acid ester of the monomethyl ether of polyethylene glycol, mol.wt. 2200, and the proportion of precursor used amounted to 3.4% of the non-volatile content of the latex.

EXAMPLE 3

Preparation of latex of thermoplastic-type polymer of Tg 4° C., in a 39:61 mixture of water and methanol under reflux The procedure of Example 1 was repeated, but substituting for the Charges A-E there described the following:

| Charge A | |
|---|---|
| Distilled water | 315 g |
| Methanol | 500 g |
| Charge B | |
| Methyl Methacrylate | 25 g |
| Butyl acrylate | 25 g |
| Stabiliser precursor (as described below) | 18 g |
| Asodiisobutyronitrile | 1 g |
| Charge C | |
| Methyl methacrylate | 206 g |
| Butyl acrylate | 206 g |
| Stabiliser precursor (as described below) | 10 g |
| Azodiisobutyronitrile | 6.7 g |
| Charge D | |
| Methyl methacrylate | 44 g |
| Butyl acrylate | 44 g |
| Azodiisobutyronitrile | 1.3 g |
| Charge E | |
| Azodiisobutyronitrile | 0.8 g |

There was thus obtained a stable, 41% solids latex of a 50:50 methyl methacrylate/butyl acrylate copolymer having a Tg of 3° C. The solids content could be raised without adversely affecting the stability of the latex by removing alcohol by distillation. The stabiliser precursor used in this procedure was the methacrylic acid ester of the monomethyl ether of polyethylene glycol, mol.wt. 2000 and the proportion used amounted to 4.8% of the non-volatile content of the latex.

EXAMPLE 4

Preparation of a latex of a thermoplastic polymer having a Tg of 41° C., in a 52:48 water/ethanol mixture under reflux.

The procedure described in Example 2 was repeated, but substituting for the Charges A-E there described the following:

| Charge A | |
|---|---|
| Distilled water | 420 g |
| Ethanol | 390 g |
| Charge B | |
| Methyl methacrylate | 40 g |
| 2-Ethylhexyl acrylate | 10 g |
| Stabiliser precursor (as described below) | 7 g |
| Azodiisobutyronitrile | 1 g |
| Charge C | |
| Stabiliser precursor (as described below) | 23 g |
| Charge D | |
| Methyl methacrylate | 320 g |
| 2-Ethylhexyl acrylate | 80 g |
| Stabiliser precursor (as described below) | 14 g |
| Azodiisobutyronitrile | 8 g |
| Charge E | |
| Methyl methacrylate | 160 g |
| 2-Ethylhexyl acrylate | 40 g |
| Azodiisobutyronitrile | 4 g |
| Charge F | |
| Azodiisobutyronitrile | 1 g |

The reflux temperature of the aqueous medium was 80° C.

The product was a stable, 46% solids latex of a 80:20 copolymer of methyl methacrylate and 2-ethylhexyl acrylate, having a theoretical Tg value of 41° C. The stabiliser precursor used was the same as that described in Example 1 and the proportion used was 6.3% based on the non-volatile content of the latex.

EXAMPLE 5

Preparation of a latex of a thermosetting-type polymer of Tg 14° C., in an 51:26:23 mixture of water/methanol/ethanol under reflux.

To a flask fitted as described in Example 1 there was charged:

| Charge A | |
|---|---|
| Distilled water | 320 g |
| Methanol | 165 g |
| Ethanol | 140 g |
| followed by | |
| Charge B | |
| Methyl methacrylate | 25 g |
| Ethyl acrylate | 28 g |
| Butyl acrylate | 5 g |
| Stabiliser precursor (as described below) | 18.4 g |
| Azodiisobutyronitrile | 1.3 g |

The contents of the flask were heated at reflux temperature (77° C.) for 30 minutes, to form a seed polymer dispersion. There was then commenced the dropwise feeding, over a period of 4 hours and into the returning distillate, of the following mixture:

| Charge C | |
|---|---|
| Methyl methacrylate | 225 g |
| Ethyl acrylate | 244 g |
| Butyl acrylate | 43 g |
| 2-Hydroxypropyl methacrylate | 33.5 g |
| N-Butoxymethylacrylamide (60% solution in 3:1 butanol/xylene) | 56 g |
| Stabiliser precursor (as described below) | 14 g |
| Azodiisobutyronitrile | 8.5 g |

When addition of Charge C was complete, the reflux temperature was maintained for 30 minutes, then a further 1 g of azodiisobutyronitrile (Charge D) was added and the same temperature maintained for a further 1 hour. Alcohols were then removed from the batch by distillation, to give a stable, 50.5% solids latex of a polymer having the composition methyl methacrylate 39%, ethyl acrylate 43%, butyl acrylate 8%, N-butoxymethylacrylamide 5% and 2-hydroxypropyl methacrylate 5%, with a theoretical Tg value of 14° C. The particle size range of the disperse phase was 0.1-1.7 microns. The stabiliser precursor used in this preparation was the product of reacting 1 mole of polyethylene glycol, mol.wt. 4000 with 2 moles of methacrylyl chloride, and the amount used was 4.8% based on the non-volatile content of the latex.

EXAMPLE 6

Preparation of latex of a thermoplastic-type homopolymer of Tg −22° C., in a 51:26:23 mixture of water/methanol/ethanol under reflux.

The procedure described in Example 5 was repeated, but substituting for Charges A-D there described the following:

| Charge A | |
|---|---|
| Distilled water | 320 g |
| Methanol | 165 g |
| Ethanol | 140 g |

| Charge B | |
|---|---|
| Ethyl acrylate | 58 g |
| Stabiliser precursor (as described below) | 20 g |
| Azodiisobutyronitrile | 1.3 g |
| Charge C | |
| Ethyl acrylate | 579 g |
| Stabiliser precursor (as described below) | 14 g |
| Azodiisobutyronitrile | 8.5 g |
| Charge D | |
| Azodiisobutyronitrile | 1 g |

The product was a stable, 51.5% solids latex of ethyl acrylate homopolymer having a theoretical Tg of −22° C. The stabiliser precursor used in this preparation was the product of successively reacting the monomethyl ether of polyethylene glycol mol.wt. 2000 (1 mole) with succinic anhydride (1 mole) and then with glycidyl methacrylate (1 mole) as described in our co-pending application Ser. No. 101,265, file Dec. 7, 1979. The amount of the precursor used was 5% based on the non-volatile content of the latex.

EXAMPLE 7

Preparation of a latex of a thermosetting-type polymer of Tg 6° C., in a 39:39:22 mixture of water/methanol/ethanol under reflux The procedure of Example 1 was repeated, but substituting for Charges A-E there described the following:

| Charge A | |
|---|---|
| Distilled water | 315 g |
| Methanol | 315 g |
| Ethanol | 185 g |
| Charge B | |
| Styrene | 14 g |
| Methyl methacrylate | 13 g |
| Butyl acrylate | 23 g |
| Stabiliser presursor (as described below) | 13 g |
| Azodiisobutyronitrile | 1 g |
| Charge C | |
| Styrene | 110 g |
| Methyl methacrylate | 102 g |
| Butyl acrylate | 178 g |
| N-Butoxymethylacrylamide (60% solution in 3:1 butanol/xylene) | 39 g |
| Methacrylic acid | 4.5 g |
| Stabiliser presursor | 6.5 g |
| Azodiisobutyronitrile | 6 g |
| Charge D | |
| Styrene | 22 g |
| Methyl methacrylate | 20 g |
| Butyl acrylate | 35 g |
| N-Butoxymethylacrylamide (60% solution in 3:1 butanol/xylene) | 7 g |
| Methacrylic acid | 1 g |
| Azodiisobutyronitrile | 1.3 g |
| Charge E | |
| Azodiisobytyronitrile | 1 g |

The reflux temperature of the aqueous medium was 76° C. The product was a stable, 40% solids content latex of a polymer having the composition styrene 26%, methyl methacrylate 25%, butyl acrylate 43%, N-butoxymethylacrylamide 5% and methacrylic acid 1%, and having a theoretical Tg value of 6° C. The stabiliser precursor used in this preparation was the same as that employed in Example 1 and was used in an amount of 3.4% based on the non-volatile content of the latex. The particle size range of the disperse phase was 0.1-2 microns.

EXAMPLE 8

The procedure of Example 7 was repeated, but replacing the stabiliser precursor there referred to by an equal weight of the maleic acid half-ester of the monomethyl ether of polyethylene glycol, mol. wt. 2000.

The product was again a stable polymer latex, but with a somewhat coarser particle size range, namely 0.5-6 microns.

EXAMPLE 9

Preparation of a latex of a thermosetting-type polymer of Tg 10° C., in a 39:61 mixture of water and methanol The procedure of Example 1 was repeated, but substituting for Charges A-E there described the following:

| Charge A | |
| --- | --- |
| Distilled water | 315 g |
| Methanol | 500 g |
| Charge B | |
| Methyl methacrylate | 26 g |
| Butyl acrylate | 24 g |
| Stabiliser precursor (as described below) | 20 g |
| Azodiisobutyronitrile | 1 g |
| Charge C | |
| Methyl methacrylate | 210 g |
| Butyl acrylate | 165 g |
| N-Butoxymethylacrylamide (60% solution in 3:1 butanol/xylene) | 44 g |
| Methacrylic acid | 11 g |
| Stabiliser precursor (as described below) | 18 g |
| Azodiisobutyronitrile | 6.7 g |
| Charge D | |
| Methyl methacrylate | 45 g |
| Butyl acrylate | 34 g |
| N-butoxymethylacrylamide (60% solution in 3:1 butanol/xylene) | 11 g |
| Methacrylic acid | 2.7 g |
| Azodiisobutyronitrile | 1.3 g |
| Charge E | |
| Azodiisobutyronitrile | 0.8 g |

The product was a 41% solids stable latex of a polymer having the same composition and characteristics as that of Example 1. The stabiliser precursor used in this preparation was the glycidyl methacrylate adduct of a carboxyl group-terminated polyvinylpyrrolidone of mol.wt. 30,000, made by polymerising vinylpyrrolidone in water in the presence of 4,4-azobis(4-cyanovaleric acid) as initiator and thioglycollic acid as chain transfer agent. The amount of the stabiliser precursor used was 6.5% based on the non-volatile content of the latex.

EXAMPLE 10

Preparation of latex of thermosetting-type polymer of Tg 18° C., in 50:50 water/2-methoxyethanol, not under reflux conditions To a 500-ml flask fitted with stirrer, thermometer, dropping funnel and inert gas feed, there was charged:

| Distilled water | 80 g |
| --- | --- |
| 2-Methoxyethanol | 80 g |

The charge was heated to 85°-90° C. and the following mixture was then added dropwise over a period of 3 hours:

| Styrene | 75 g |
| --- | --- |
| Ethyl acrylate | 75 g |
| Butyl acrylate | 15 g |
| 2-Hydroxypropylmethacrylate | 18 g |
| Stabiliser precursor | 29 g |
| Azodiisobutyronitrile | 3 g |

When the addition was complete, the temperature was maintained at 85°-90° C. for 30 minutes, then a further 0.3 g of azodiisobutyronitrile was added and heating continued at the same temperature for 1 hour more. The product was a stable, 57% solids latex of a polymer having the composition styrene 41%, ethyl acrylate 41%, butyl acrylate 8% and 2-hydroxypropyl methacrylate 10%, and having a theoretical Tg value of 18° C. The particle size range was 0.1-1 micron. The stabiliser precursor used in this preparation was the same as that described in Example 6 and was employed in an amount of 13.7% based on the non-volatile content of the latex.

EXAMPLE 11

Preparation of latex of plasticised polymethyl methacrylate in 50:25:25 water/methanol/ethanol mixture under reflux The procedure described in Example 5 was repeated, but substituting for Charges A-D there described the following:

| Charge A | |
| --- | --- |
| Distilled water | 247 g |
| Methanol | 127 g |
| Ethanol | 127 g |
| Charge B | |
| Methyl methacrylate | 27 g |
| Polyester plasticiser (as described below) | 17 g |
| Stabiliser presursor (as described below) | 15 g |
| Azodiisobutyronitrile | 1 g |
| Charge C | |
| Methyl methacrylate | 271 g |
| Polyester plasticiser (as described below) | 171 g |
| Stabiliser precursor (as described below) | 11 g |
| Azodiisobutyronitrile | 6 g |
| Charge D | |
| Azodiisobutyronitrile | 1 g |

The refluxing temperature of the water/methanol/ethanol mixture was 76° C. The product was a stable, 50% solids latex of polymethyl methacrylate/polyester plasticiser in the ratio 60:40, having a Tg of 55° C. as compared with a Tg of 105° C. for unplasticised polymethyl methacrylate. The polyester plasticiser used was the product of condensing together neopentyl glycol (0.67 mole), adipic acid (1 mole) and benzyl alcohol (0.67 mole). The stabiliser precursor used was the same as that employed in Example 1, and was present in an amount of 5.5% based on the non-volatile content of the latex.

Comparative Example A

Attempted preparation of unplasticised polymethyl methacrylate

The procedure of Example 11 was repeated, but omitting the polyester plasticiser. The latex produced during the early stages of addition of Charge C was much coarser than that of Example 11, and the disperse phase completely flocculated when addition had proceeded to a stage corresponding to a latex non-volatile content of about 15%.

EXAMPLE 12

Use of a chain transfer agent soluble in the aqueous medium

The product of Example 5 was repeated, with the addition of 0.6 g of thioglycollic acid to Charge B and of 6 g of the same substance to Charge C (amounting in total to 1% of the monomers being polymerised).

The product was a stable latex of somewhat coarser particle size than that of Example 5, namely 0.5–8 microns; thus the maximum particle size was increased by the use of the chain transfer agent.

Comparative Examples B and C

The procedure of Example 5 was repeated, but replacing the bis(methacrylic ester) of polyethylene glycol, mol.wt. 4000 that was there used as the stabiliser precursor by a similar amount of the analogous bis-ester of polyethylene glycol, mol.wt. 1000.

The resulting latex was very coarse during the early stages of polymerisation of the monomers and the disperse phase became unstable, depositing on the walls of the flask and on the stirrer, when a non-volatile content of about 15% had been reached.

A similar result was obtained when the original stabiliser precursor of Example 5 was replaced by the methacrylic acid ester of polyethylene glycol, mol.wt. 750.

EXAMPLES 13–14

The procedure of Example 5 was repeated, using as initiator, in place of azodiisobutyronitrile, equal amounts of 4,4-azobis(4-cyanovaleric acid) or lauroyl peroxide, respectively.

Similar results to those of Example 5 were obtained. The azo initiator led to the production of a slightly finer particle size range than was recorded in that Example, namely 0.1–1 micron, while the peroxy initiator gave a somewhat coarser range, namely 0.3–4 microns.

EXAMPLE 15

Preparation of latex of thermosetting-type polymer modified by a reactive silicon compound To a 2-liter flask fitted as described in Example 1 there was charged the following:

| Charge A | |
| --- | --- |
| Distilled water | 215 g |
| Methanol | 112 g |
| Ethanol | 95 g |

To this was added the following mixture:

| Charge B | |
| --- | --- |
| Methyl methacrylate | 12 g |
| Butyl methacrylate | 5 g |
| Ethyl acrylate | 12 g |
| Butyl acrylate | 4 g |
| Stabiliser precursor (as described in Example 1) | 8 g |
| Azodiisobutyronitrile | 0.9 g | and the batch was heated for 30 minutes at reflux temperature (76° C.) to form a seed dispersion of polymer. There was then begun the dropwise addition, into the returning distillate, of the following mixture:

| Charge C | |
| --- | --- |
| Methyl methacrylate | 112 g |
| Butyl methacrylate | 51 g |
| Ethyl acrylate | 112 g |
| Butyl acrylate | 48 g |
| 2-Hydroxypropyl methacrylate | 21 g |
| N-butoxymethylacrylamide (60% solution in 3:1 butanol/xylene) | 24 g |
| Stabiliser precursor (as described in Example 1) | 10 g |
| Azodiisobutyronitrile | 5 g |

Three-quarters of Charge C was added over a period of 4 hours: there was then added to the remaining one-quarter of Charge C the following Charge D, and the mixture was fed dropwise into the returning distillate over a period of 1½ hours:

| Charge D | |
| --- | --- |
| Silicone intermidiate QP8-5314 (ex. Dow Corning Inc.) | 180 g |
| N-Butoxymethylacrylamide (60% solution as above) | 12 g |

After this last addition was completed, the batch was heated at reflux temperature for a further 30 minutes, after which there was added (Charge E) 1 g of azodiisobutyronitrile. Following a final period of 1 hour at reflux temperature, the batch was vacuum stripped to give a 58% solids stable dispersion of polymer having the composition methyl methacrylate 31%, butyl methacrylate 14%, ethyl acrylate 31%, butyl acrylate 13%, 2-hydroxypropyl methacrylate 5.5% and N-butoxymethylacrylamide 5.5%, the polymer being modified to the extent of 20% by reaction of the silicone intermediate with the hydroxyl groups present. The Tg of the acrylic polymer was 7° C.

EXAMPLE 16

Preparation of latex of thermosetting-type polymer containing an amino resin as cross-linking agent To a 1-liter flask fitted with stirrer, thermometer, condenser, dropping funnel and inert gas feed, there was charged:

| Charge A | |
| --- | --- |
| Distilled water | 40 g |
| Diethylene glycol | 34 g |
| Tetraethylene glycol | 7 g |
| Methylated melamine/formaldehyde resin | 54 g |

-continued

| Charge A |
|---|
| ("Cymel" 301* ex. Cyanamid) |

*"Cymel" is a Registered Trade Mark.

The contents of the flask were heated to 90° C. and there was then added dropwise, over a period of 3 hours, the following:

| Charge B | |
|---|---|
| Styrene | 95 g |
| Ethyl acrylate | 50 g |
| 2-Ethylhexyl acrylate | 15 g |
| 2-Hydroxyisopropyl methacrylate | 16 g |
| Ethanol | 25 g |
| Stabiliser precursor (as described below) | 25 g |
| Azodiisobutyronitrile | 3.3 g |

The batch was heated at 90° C. for 30 minutes after this addition was completed and there was then added (Charge C) 0.5 g of azodiisobutyronitrile. Finally, heating was continued for a further 1 hour at the same temperature. The product was a stable, 72% solids latex of polymer having the composition styrene 54%, ethyl acrylate 28%, 2-ethylhexyl acrylate 9% and 2-hydroxyisopropyl methacrylate 9%. The theoretical Tg of the polymer was 26° C. The stabiliser precursor used in this preparation was the same as that described in Example 1 and was present in an amount of 11.6% based on the non-volatile content of the latex.

Comparative Example D

Attempted preparation of latex, using peroxide initiator, at a polymerisation temperature less than 10° above the Tg of the polymer in 39:61 water/methanol An attempt was made to repeat the procedure of Example 1, but with the Charges A-E there described replaced by the following charges, and operating under reduced pressure so that the temperature of reflux was 50° C. only:

| Charge A | |
|---|---|
| Distilled water | 245 g |
| Methanol | 389 g |
| Stabiliser precursor (as described below) | 14.7 g |
| Charge B | |
| Methyl methacrylate | 28.3 g |
| Butyl acrylate | 10.4 g |
| Bis(4-t-buytlcyclohexyl-peroxydicarbonate) | 0.7 g |
| Charge C | |
| Methyl methacrylate | 234 g |
| Butyl acrylate | 86.4 g |
| Stabiliser precursor (as described below) | 12.4 g |
| Bis(4-t-butylcyclohexyl-peroxydicarbonate) | 5.0 g |
| Charge D | |
| Methyl methacrylate | 50.3 g |
| Butyl acrylate | 18.5 g |
| Bis(4-t-butylcyclohexyl)-peroxydicarbonate | 1 g |
| Charge E | |
| Bis(4-t-butylcyclohexyl)-peroxydicarbonate | 0.62 g |

Charges A and B heated together to 55° C., and vacuum was then applied to the system so as to achieve a reflux temperature of 50° C. This temperature was held for 30 minutes in order to form a seed dispersion, after which Charge C was slowly fed in. The experiment was abandoned after this feed has been continued for only 30 minutes; the dispersion had an unsatisfactory appearance from the beginning and by the end of this period a thick mass of polymer had separated out from the aqueous medium.

The composition of the polymer which it was attempted to prepare was methyl methacrylate 73%, butyl acrylate 27%, the theoretical Tg of this polymer was 43° C.

The stabiliser precursor used in this experiment was the methacrylic acid ester of the monomethyl ether of polyethylene glycol, mol.wt. 1600.

Comparative Example E

Attempted preparation of latex, using azo initiator, at a polymerisation temperature less than 10° above the Tg of the polymer, in 39:61 water/methanol An attempt was made to repeat the procedure of Example 1, but with the Charges A-E there described replaced by the following charges, and operating under reduced pressure so that the temperature of reflux was 55° C. only:

| Charge A | |
|---|---|
| Distilled water | 245 g |
| Methanol | 389 g |
| Stabiliser precursor (as described in Comparative Example D) | 14.7 g |
| Charge B | |
| Methyl methacrylate | 29.3 g |
| Butyl acrylate | 9.7 g |
| 2,2-azobis(2,4-dimethyl-valeronitrile) | 0.7 g |
| Charge C | |
| Methyl methacrylate | 240.6 g |
| Butyl acrylate | 79.8 g |
| Stabiliser precursor (as described in Comparative Example D) | 12.4 g |
| 2,2-azobis(2,4-dimethyl-valeronitrile) | 5.0 g |
| Charge D | |
| Methyl methacrylate | 51.5 g |
| Butyl acrylate | 17 g |
| 2,2-azobis(2,4-dimethyl-valeronitrile) | 1.0 g |
| Charge E | |
| 2,2-azobis(2,4-dimethyl-valeronitrile) | 0.62 g |

Charges A and B were heated together to 60° C., and vacuum was then applied to the system so as to achieve a reflux temperature of 54°-55° C. This temperature was held for 30 minutes in order to form a seed dispersion, after which Charge C was slowly fed in over a period of 3 hours. The initial seed dispersion appeared to be of good quality, but as the feeding in of Charge C progressed, "bits" were seen to form and by the end of the feed these had aggregated to form large lumps of polymer. The experiment was then abandoned.

The composition of the polymer which it was attempted to prepare was methyl methacrylate 75%, butyl acrylate 25%; the theoretical Tg of this polymer was 46° C.

EXAMPLE 17

This Example illustrates the preparation of a water-borne, medium-gloss non-crosslinking acrylic primer coating composition from one of the latices described above.

A. Preparation of Polymer Latex

A latex was prepared, by the method generally described in Example 7, of a copolymer having the composition styrene/methyl methacrylate/butyl acrylate/N-Butoxymethylacrylamide/methacrylic acid 26/25/43/5/1, the latex having a non-volatile content of 46.8%.

B. Preparation of Pigment Millbase

A mixture of titanium dioxide (44 g: "Kronos" RN 45 (Registered Trade Mark), strontium chromate (18.5 g), blanc fixe (76.5 g), china clay (45 g: Grade D) and the polymer latex described in (A) above (304 g) was ground overnight in quater-gallon capacity ball mill using 1050 g of quarter-inch steatite balls.

C. Preparation and Application of Paint Composition

The millbase prepared as in (B) above (488 parts) was blended with a further 200 parts of the latex prepared as in (A). The primer paint so obtained was applied to panels of hot-dip galvanised steel pretreated with "Bonderite" 1303 (Registered Trade Mark) by means of a wire-wound applicator bar so as to give a dry film thickness of 5 microns. The coating was stoved in an oven for less than 1 minute so as to attain a metal peak temperature of 193°–199° C.; there was then applied over the coating a commercially available ionically stabilised water-borne acrylic top-coat. When subjected to the humidity test of B.S. 3900, the performance of the panels after 500 hours was equal to that of similar panels prepared with a non-aqueous epoxy primer which is in wide commercial use. In the salt spray test of A.S.T.M. B117-64, a similar results was obtained.

EXAMPLE 18

This Example illustrates the preparation of a high gloss paint from one of the polymer latices described above.

A. Preparation of Polymer Latices

Two latices were prepared by the general method described in Example 2, Latex (i) had the polymer composition styrene 39.7%, ethyl acrylate 53.2%, N-butoxymethylacrylamide 5.9% and methacrylic acid 1.2%, and a solids content of 44%. Latex (ii) had the polymer composition styrene 25.1%, ethyl acrylate 67.7%, N-butoxymethylacrylamide 5.9% and methacrylic acid 1.2%, and a solids content of 46.9%.

B. Preparation of Millbase

A mixture of 135 g of titanium dioxide pigment ("Runa" RH 472: Registered Trade Mark of Laporte Industries Limited) and 302 g of the polymer latex described in (A) was ground for 24 hours in a quarter-gallon ball mill with a charge of 1050 g of quarter-inch steatite balls. A fluid dispersion was obtained having a particle size of less than 5 microns as measured on a Hegman gauge. There was incorporated into this millbase 6.6% by weight of a water-miscible hexamethoxymethylmelamine.

C. Preparation and Application of Paint

The blend of millbase and melamine-formaldehyde resin as prepared in (B) (13.5 parts) was mixed with the latex (ii) described above (18 parts). The paint so obtained was catalysed by addition of 0.08 part of p-toluene sulphonic acid and was then applied to pretreated aluminium by means of a wire-wound applicator bar and stoved in an oven for less than 1 minute so as to attain a metal peak temperature of 193°–199° C. The coating which resulted had the following excellent characteristics:

| | |
|---|---|
| Gloss (60° meter) | 88% |
| Hardness (pencil test) | H |
| Reverse Impact (lb/sq.in) | 80 |
| Bend Test | 1T |

EXAMPLE 19

This Example illustrates the preparation of an unpigmented finish suitable for spray application to an automobile body previously treated with a pigmented basecoat.

A. Preparation of Polymer Latex

A latex was prepared, according to the general method described in Example 2, of a polymer having the composition styrene 25%, methyl methacrylate 18%, butyl methacrylate 24%, 2-ethylhexyl acrylate 21%, hydroxyisopropyl methacrylate 10% and dimethylaminoethyl methacrylate 2%; the latex had a solids content of 52%.

B. Preparation of Paint

The latex described in (A) (164 parts), a melamine-formaldehyde resin ("Beetle" BE 670) (12.5 parts) and water (40 parts) were mixed and p-toluene sulphonic acid (1 part) was added. The finish so obtained, which had a viscosity of 33 secs. (B.S. B3 cup at 25° C.) and a solids content of 45%, was sprayed on to an automobile panel, already coated with a basecoat, using a Binks 19 spray gun with suction feed and 65 p.s.i. air pressure. The film produced on the substrate was free from sagging and other defects. It was dried at room temperature for 1 hour, baked for 30 minutes at 80° C. and then for a further 30 minutes at 150° C. The film had a thickness of 50 microns, a gloss of 90% (20° meter) and a Knoop hardness of 6.4–7.4. It was free from defects.

EXAMPLE 20

This Example illustrates the preparation of a finish which is capable of being cured at moderate temperatures and which is therefore suitable for applications in the Industrial market.

A latex was prepared by the general method of Example 5 of a polymer having the composition methyl methacrylate 39.2%, ethyl acrylate 42.7%, butyl acrylate 7.5%, hydroxyisopropyl methacrylate 5.3% and N-butoxymethylacrylamide 5.3%; the latex had a solids content of 50.1%. This latex (14.8 parts) was blended with a melamine-formaldehyde resin ("Beetle" BE 670) (0.5 part) and the blend was catalysed by the addition of 0.05 part of p-toluene sulphonic acid:

The paint thus obtained was applied by wire-wound applicator bar to aluminium panels, which were then subjected to various curing schedules as shown in the table below: the degree of cure achieved in each case was then determined by measuring the percentage by weight of the film which remained undissolved after extraction with boiling acetone for 2 hours in a Soxhlet apparatus.

| Curing Schedule | % Cure |
| --- | --- |
| 30 mins. at 150° C. | 97 |
| 30 mins. at 120° C. | 99.2 |
| 30 mins. at 100° C. | 96.6 |
| 30 mins. at 80° C. | 92.8 |
| 10 mins. at 150° C. | 95.6 |

We claim:

1. A process for the production of a sterically stabilised dispersion of polymer particles of a size in the range of 0.01 to 10 microns in an aqueous medium, the process comprising the polymerisation in the aqueous medium of one or more ethylenically unsaturated monomers at a temperature which is at least 10° C. higher than the glass transition temperature of the polymer which is formed, in the presence of a free radical initiator which is soluble in the said monomer or monomers and also in the presence of a stabiliser precursor compound which is soluble in the aqueous medium and which contains in the molecule a polymeric component of molecular weight at least 1000 which is solvatable by the aqueous medium and an unsaturated grouping which is capable of copolymerising with the said monomer or monomers, the aqueous medium being a mixture comprising (a) at least 30% by weight of water and (b) not more than 70% by weight of a second constituent which is miscible with water, the nature and proportion of the second constituent being such that the mixture as a whole is capable of dissolving the monomer or monomers being polymerised to the extent of at least 3% by weight but is a non-solvent for the polymer formed, the concentration of free monomer in the polymerisation mixture being maintained throughout the process at a level such that at no time does the free monomer form a separate phase and the total amount of monomer polymerised being such that the resulting dispersion contains at least 20% by weight of polymer.

2. A process as claimed in claim 1, wherein at least one monomer being polymerised is selected from acrylic acid and methacrylic acid and their esters, amides and nitriles.

3. A process as claimed in claim 1 or claim 2, wherein the temperature of polymerisation is at least 30° C. higher than the glass transition temperature of the polymer which is formed.

4. A process as claimed in claim 1 or claim 2, wherein the second constituent of the aqueous medium is methanol or ethanol.

5. A process as claimed in claim 1 or claim 2, wherein the molecular weight of the solvatable component of the stabiliser precursor compound is at least 2000.

6. A process as claimed in claim 1 or claim 2, wherein the solvatable component of the stabiliser precursor is derived from a polyethylene glycol, or a monoalkyl ether thereof, of molecular weight in the range 2000-4000.

7. A process as claimed in claim 6, wherein the stabiliser precursor is an ester of the polyethylene glycol, or ether thereof, with a copolymerisable unsaturated acid.

8. A process as claimed in claim 1 or claim 2, wherein the proportion of stabiliser precursor used is in the range 2–10% by weight of the disperse polymer content of the dispersion.

9. A process as claimed in claim 1 or claim 2, wherein there is initially added to the aqueous medium a small portion, not exceeding 20% by weight, of the total monomer charge, which portion is allowed to polymerise first to form a seed dispersion of polymer and is subsequently followed by the addition thereto and polymerisation of the main portion of the monomer charge.

10. A modification of the process as claimed in claim 1 or claim 2, wherein the aqueous medium already contains a seed dispersion of polymer formed by the previous polymerisation therein of monomer which is different from the main monomer which is to be polymerised as hereinbefore specified, the amount of such different monomer not exceeding 20% of the aggregate of its own weight and the weight of the main monomer.

* * * * *